UNITED STATES PATENT OFFICE.

UTLEY WEDGE, OF ARDMORE, PENNSYLVANIA, ASSIGNOR TO ELECTRO-CHEMICAL SUPPLY & ENGINEERING COMPANY, OF PHILADELPHIA, PENNSYLVANIA, A CORPORATION OF PENNSYLVANIA.

WATER AND ACID PROOF CEMENT AND PROCESS OF MAKING SAME.

1,220,575.     Specification of Letters Patent.     Patented Mar. 27, 1917.

No Drawing.     Application filed March 1, 1915.  Serial No. 11,362.

*To all whom it may concern:*

Be it known that I, UTLEY WEDGE, a citizen of the United States, residing in Ardmore, Pennsylvania, have invented certain Improvements in Water and Acid Proof Cement and Processes of Making Same, of which the following is a specification.

My invention relates to that method of producing an acid proof cement which consists in mixing crystalline silica, such as ground quartz, diatomaceous earth, or the like, with silicate of soda, the object of my invention being to produce a cement which will be water-proof as well as acid-proof, said invention consisting in adding to the silicious material an acid which, when the silicate of soda is added, will precipitate finely divided silica in the cement, such acid being preferably an organic acid and preferably also being added in powdered form.

In a previous application filed by me on the nineteenth day of December, 1914, Serial No. 878,199, reference was made to the familiar process of producing acid proof cement which consisted in adding silicate of soda to silicious material. It has been found that if this cement after application in construction is brought into contact with aqueous solutions of sulfuric acid, hydrochloric acid, or nitric acid, it hardens perceptibly on the surface, but it has also been found that cement made in this way when subjected for a long time to the action of water becomes permeated with moisture and disintegrates, the formation of the thin film of hard or dense material at the surface in the manner described not being sufficient to protect the interior mass of the cement from the action of moisture.

It has likewise been found that this cement, when used in constructing the wall of a tank or tower, is hardened and made superficially dense at the interior face where it is in contact with acid but that the exterior of the structure, which is not in contact with acid, becomes disintegrated on exposure to water or moisture.

In attempting to overcome this difficulty it has been found that if an acid in solid form, preferably an organic acid, such as oxalic acid, stearic acid, oleic acid, or the like, in a finely divided state, is added to the dry silicious material and thoroughly mixed therewith the subsequent addition of the silicate of soda, besides forming basic silicate of soda, will cause the organic acid to precipitate, throughout the mass, finely divided silicate or silicate in colloidal or gelatinous form, and the resulting cement will have a density and closeness of texture not hitherto secured, and in addition to being acid-proof will also be free from liability to disintegration by water.

I further find that in spite of the direct application of silicate of soda which is soluble in water the above-noted advantages can be secured even when the mass of acid used is as small as three per cent. by weight of the silicious material employed, although the amount of acid used may vary according to the result desired or the character of the acid used.

An acid salt such, for instance, as acid sodium sulfate in solid form may in many cases prove an acceptable substitute for an acid in the compound, and the term "acid" as used in the claims is therefore to be interpreted as including such acid salt.

I claim:

1. As an improvement in the manufacture of acid-proof cement by mixing silicious material and silicate of soda, the mode herein described of rendering the cement waterproof, said mode consisting in adding silicate of soda to the silicious material and, previous to such addition, adding to the silicious material an acid which will, on the later addition of the silicate of soda, act as a precipitant of finely divided silica in the cement.

2. As an improvement in the manufacture of acid-proof cement by mixing silicious material and silicate of soda, the mode herein described of rendering the cement water-proof, said mode consisting in adding silicate of soda to the silicious material and, previous to such addition, adding to the silicious material an acid which will, on the later addition of silicate of soda, precipitate silica in a gelatinous or colloidal state.

3. As an improvement in the manufacture of acid-proof cement by mixing silicious material and silicate of soda, the mode herein described of rendering the cement water-proof, said mode consisting in adding silicate of soda to the silicious material, and, previous to such addition, adding to the silicious material in finely divided form, an acid also in finely divided form and which will, on the addition of the silicate of soda, precipitate finely divided silica in the cement.

In testimony whereof, I have signed my name to this specification, in the presence of two subscribing witnesses.

UTLEY WEDGE.

Witnesses:
KATE A. BEADLE,
HAMILTON D. TURNER.